(No Model.)

C. SNOW.
VEHICLE BRAKE.

No. 570,345. Patented Oct. 27, 1896.

WITNESSES:

INVENTOR
C. Snow.
BY
Munn & Co.
ATTORNEYS.

UNITED STATES PATENT OFFICE.

CLARK SNOW, OF OXFORD, ALABAMA.

VEHICLE-BRAKE.

SPECIFICATION forming part of Letters Patent No. 570,345, dated October 27, 1896.

Application filed November 14, 1895. Serial No. 568,984. (No model.)

*To all whom it may concern:*

Be it known that I, CLARK SNOW, of Oxford, in the county of Calhoun and State of Alabama, have invented a new and useful Improvement in Brakes, of which the following is a full, clear, and exact description.

My invention relates to an improvement in brakes adapted for attachment to any vehicle; and the object of the invention is to provide a brake of exceedingly simple, durable, and economic construction and capable of expeditious and convenient attachment to the running-gear or the body of the vehicle, the brake being so made that when set to a bearing against the wheels the mechanism employed for setting the brake will automatically lock the same in its set position, the said mechanism being so constructed that as resistance on the part of the wheels increases the power of the brake will be substantially greater in proportion.

A further object of the invention is to provide a means for readily releasing the wheels from the brakes, the brakes when released being held perfectly clear of the wheels.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
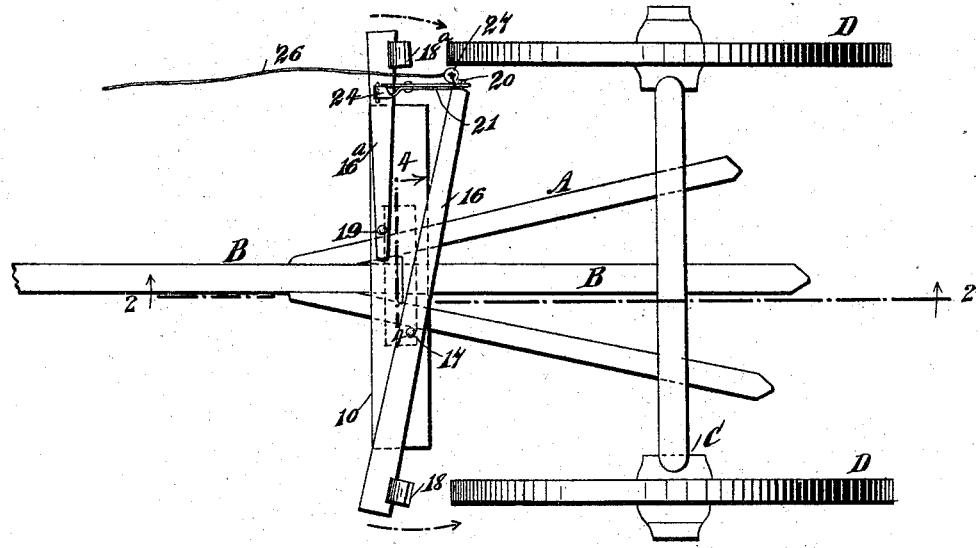
Figure 2:
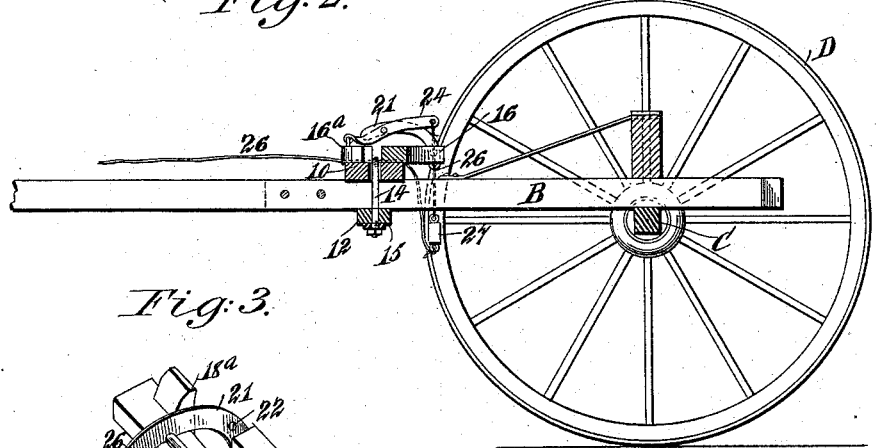
Figure 3:
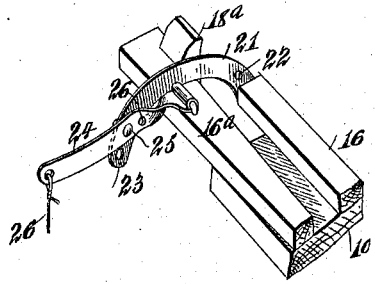
Figure 4:
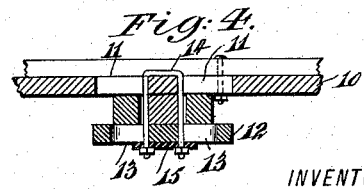

Figure 1 is a plan view of the rear portion of the running-gear of a wagon, illustrating the application of the improved brake thereto, the brake-shoes or rub-blocks being shown as disengaged from the wheels. Fig. 2 is a longitudinal vertical section taken substantially on the line 2 2 of Fig. 1. Fig. 3 is a detail perspective view of a portion of the brake-levers and also illustrates the mechanism for applying the brakes, the said mechanism being in the position it occupies when the brakes are on; and Fig. 4 is a detail vertical section taken practically on the line 4 4 of Fig. 1.

The brake, as shown in the drawings, is applied to the running-gear of a wagon; and the hounds A and coupling-pole B may be of the usual construction and attached to the axle C in the ordinary way, the axle being supported by traction-wheels D. In making this application of the brake a bed-bar 10 is employed, which rests upon the top of the hounds and coupling-pole, extending transversely beyond the sides thereof a convenient distance from the rear wheels. This bed-bar is provided with an opening 11 at each side of its center, the openings being somewhat elongated, and in addition to the bed-bar a binding-bar 12 is used, much shorter than the bed-bar and engaging with the bottom face of the said coupling-pole and hounds. The binding-bar is likewise provided with a longitudinal slot 13 at each side of its center, and the bed and binding bars are rigidly secured to the running-gear by passing a clip or bolts 14 over the bridge between the slots 11 in the bed-bar, downward between the hounds and the coupling-pole at each side of the latter, and through the slots 13 in the binding-bar, and likewise through a clip-plate or washers 15, engaging with the binding-bar, the lower ends of the said clip being provided with suitable nuts, as shown best in Fig. 4.

Two brake-levers 16 and 16$^a$ are employed in the construction of the brake. Both levers are horizontally located on the body-bar 10, and the rear lever 16 is preferably much longer than the forward lever 16$^a$. The rear lever 16 is of sufficient length to extend from a point near the left-hand hind wheel, for example, as shown in Fig. 1, to a point near the right-hand hind wheel of the vehicle, and is fulcrumed on the bed-bar by means of a bolt or pin 17, placed about centrally of the lever, and at the left-hand end of said lever a brake-shoe or rub-block 18 is secured. The brake-lever 16 is also preferably tapering, being widest at that end where the brake-shoe or rub-block is placed.

The fulcrum 17 of the rear brake-lever 16 is placed nearer the rear than the forward side of the bed. The forward or shorter brake-lever 16$^a$ is likewise preferably made tapering in form, being widest at its outer end, which is located in front of the right-hand hind wheel D, and is provided with a brake-shoe or rub-block 18$^a$. The shorter lever 16$^a$ is pivoted by means of a pin or bolt 19, located near its inner end, and the pivot-pin 19 of the shorter lever is located at one side of the center of the bed-bar and the pivot-pin 17 at the opposite side of the said center.

The distance between the pivot of each brake-lever and its outer end is substantially the same. These two levers are so constructed and so located relative to each other that when they are drawn together, so that their opposing portions are practically in contact, or are parallel, the brake-shoes carried by the levers will be in transverse alinement and will likewise be brought to an engagement with the wheels they are intended to brake. By slotting the bed and binding bars these two parts may be adjusted to any size of wagon or timbers without weakening them by boring or producing extra openings therein.

The mechanism employed for operating the brake-levers is substantially a toggle, as shown in Figs. 1, 2, and 3, in which it will be observed that a pin 20 is located upon the contracted or inner end of the rear brake-lever 16, and a curved bar or link 21 is adjustably pivoted on said pin by producing preferably two or more apertures 22 in the rear end of the bar, and the said bar is arched in a forwardly direction, or so that it may extend over the forward brake-lever 16ª, as shown particularly in Fig. 3, and the forward end of the arched or curved bar or link 21 is provided with one or more, preferably two, apertures 23, and is pivotally and adjustably connected with a shifting lever 24 by passing a pin 25 through one of a number of apertures 26 made in the said shifting lever and through one of the apertures in the arched bar or link 21.

The shifting lever has a pivotal or hinged connection with the forward brake-lever 16ª, and its connection with the said forward brake-lever is so made with relation to its connection with the arched bar 21 that when the said arched bar is carried to its full forward position, engaging with the top face of the brake-lever 16ª, the pivot connection between the shifting lever and the arched bar will be lower than the point where the said shifting lever is connected with the brake-lever, so that when the arched bar is carried to this position, which is the position it assumes when the brake-shoes are carried to an engagement with the wheels, the said arched bar will not be lifted upward and thus disengage the shoes from the wheels. The said brake-levers will at this time be brought in close proximity to each other and substantially parallel.

It will be observed that as resistance on the part of the wheels to which the brake-shoes are applied increases the braking power of the shoes upon the wheels will be substantially increased in greater proportion.

The shifting lever 24 is operated through the medium of a cord or chain 26, which is carried to a hand or to a foot lever or to any convenient point either at the front or at the rear of the vehicle, and this lever may be of the ordinary construction. At a point near the junction of the cord or chain 26 with the shifting lever 24, however, a weight 27 is secured to the chain or cord, as shown in Fig. 2, and in operation, after the shifting lever has been brought to a horizontal forwardly-extending position to apply the brake-shoes to the wheels, and it is desired to relieve the wheels from the pressure of the said shoes, the brake chain or cable 26 is manipulated in a manner to throw the brake rearward, so that it will drop downward at the rear of the rear brake-lever 16, as shown in Fig. 2, carrying the shifting lever over in direction of the rear of the vehicle.

A brake constructed as above set forth is not only simple, conveniently operated, and durable, but, as heretofore stated, it is applicable to any form of vehicle and may be applied without injury to either the running-gear or to the body of the vehicle. The brake can be operated from either the side, front, or rear of the vehicle.

Having thus described my invention, I claim as new and desire to secure by Letters Patent—

1. In a brake for vehicles, the combination, with a support, and two levers of unequal length pivoted upon the said support, extending one beyond the other, and their pivot-points being at opposite sides of the center of the support, and brake-shoes secured to the outer end portions of the said brake-levers, of an arched bar pivotally connected with the inner end of the longer lever, adapted when the levers are in braking position to extend over and beyond the shorter lever, a shifting lever having hinged connection with the said shorter brake-lever and a pivotal connection with the arched bar, the pivotal connection of the arched bar being lower than its fulcrum when the arched bar is in its braking position, and a weight connected with the outer end of the said shifting lever, the said weight being adapted for attachment to a hand-lever, substantially as and for the purpose set forth.

2. The combination of two mounted brake-levers, a bar pivotally connected to one lever and capable of extending over the remaining lever, a shifting lever fulcrumed on the said remaining lever, the length of the shifting lever being approximately equal to that of the bar and the shifting lever being capable of moving downwardly in approximate parallelism with the said bar, and a weight hung pendent from the free end of the shifting lever, the weight being capable of assisting in the throwing of the lever, substantially as described.

CLARK SNOW.

Witnesses:
W. C. WARNOCK,
A. L. HIGGINBOTHAM.